(12) United States Patent
Kozarekar et al.

(10) Patent No.: US 8,368,336 B2
(45) Date of Patent: Feb. 5, 2013

(54) VEHICLE SYSTEM FOR CONTROLLING MOTOR TORQUE

(75) Inventors: Shailesh Shrikant Kozarekar, Novi, MI (US); Terri Wrobel, Naperville, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/329,635

(22) Filed: Dec. 19, 2011

(65) Prior Publication Data
US 2012/0133314 A1 May 31, 2012

(51) Int. Cl.
*G05B 5/00* (2006.01)
(52) U.S. Cl. .......................... 318/471; 318/434; 318/778
(58) Field of Classification Search .................. 318/471, 318/434, 778, 800, 473
See application file for complete search history.

(56) References Cited

U.S. PATENT DOCUMENTS

| 5,490,584 | A | 2/1996 | Estaque et al. |
| 6,414,832 | B1 * | 7/2002 | Crecelius et al. ............. 361/120 |
| 2004/0206341 | A1 | 10/2004 | Clarkson et al. |
| 2005/0242760 | A1 * | 11/2005 | Fujita et al. .................. 318/434 |

FOREIGN PATENT DOCUMENTS

WO   2009090386 A2   7/2009

* cited by examiner

*Primary Examiner* — Karen Masih
(74) *Attorney, Agent, or Firm* — David B. Kelley; Brooks Kushman P.C.

(57) ABSTRACT

A vehicle having a vehicle system is provided with a motor having a housing and a stator. The motor is configured to provide motor torque for vehicle propulsion. The vehicle system is also provided with at least one controller that is configured to receive input indicative of at least one of the housing temperature and the stator temperature, and control the motor torque based on a comparison of the input to predetermined thermal data.

19 Claims, 3 Drawing Sheets

VEHICLE SYSTEM FOR CONTROLLING MOTOR TORQUE

TECHNICAL FIELD

One or more embodiments relate to a vehicle system for controlling motor torque in response to motor temperatures.

BACKGROUND

Hybrid electric vehicles (HEVs) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. Battery electric vehicles (BEVs) utilize one or more motors to provide the power needed to propel a vehicle, without an internal combustion engine. By eliminating the engine, BEVs may provide fuel economy improvements over HEVs.

The one or more motors each include a stator that is secured within a motor housing. Motor operation results in a reaction torque being applied to the stator. The stator is secured to the housing, to withstand this reaction torque.

SUMMARY

In one embodiment, a vehicle system is provided with a motor having a housing and a stator. The motor is configured to provide motor torque for vehicle propulsion. The vehicle system is also provided with at least one controller that is configured to receive input indicative of at least one of the housing temperature and the stator temperature, and control the motor torque based on a comparison of the input to predetermined thermal data.

In another embodiment, a vehicle system is provided with at least one controller that is configured to receive input indicative of a temperature of a motor housing and stator. The controller calculates a temperature difference value based on a difference between the housing temperature and the stator temperature. The controller also compares the temperature difference value to a predetermined temperature difference to evaluate motor performance, and provides output indicative of a motor torque request in response to the motor performance.

In yet another embodiment, a vehicle is provided with a motor having a housing and a stator, and configured to provide torque for vehicle propulsion. At least one sensor is coupled to the motor and configured to provide a signal that is indicative of at least one of the housing temperature and the stator temperature. At least one controller communicates with the motor and is configured to control the motor torque based on a comparison of the signal to predetermined thermal data.

As such, various embodiments provide one or more advantages. Battery Electric Vehicles (BEVs) utilize one or more electric motors to provide the power needed to propel a vehicle. This arrangement provides improved fuel economy over a vehicle that has only an internal combustion engine, and HEVs. Further, BEVs are connected to an external power source for charging a high voltage battery. This external source, may be a renewable source such as a photovoltaic solar panel, or wind turbine, for reducing a carbon footprint of the vehicle. The vehicle system monitors motor temperatures to evaluate motor performance, and controls motor torque in response to the motor performance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
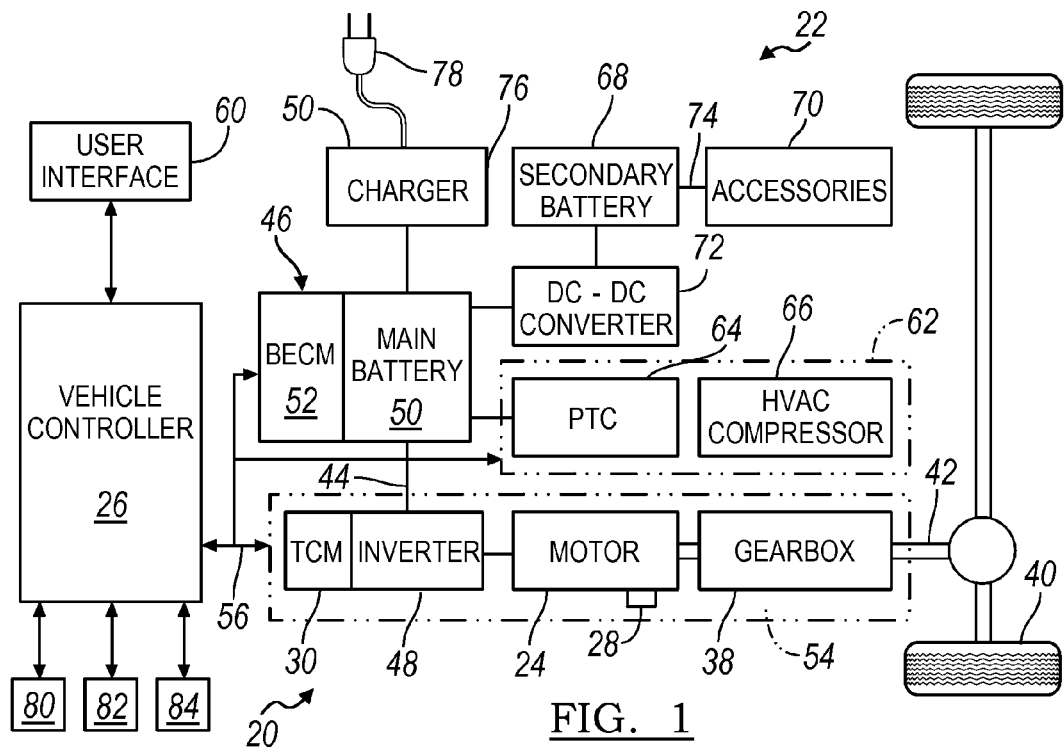
FIG. 1 is a schematic diagram of a vehicle system for controlling motor torque according to one or more embodiments, and illustrated within a vehicle.

With reference to FIG. 1, a vehicle system for controlling motor torque is illustrated in accordance with one or more embodiments and is generally referenced by numeral 20. The vehicle system 20 is depicted within a vehicle 22. The vehicle system 20 includes an electric motor 24 that provides output torque for propelling the vehicle 22. The vehicle system 20 also includes a vehicle controller 26 and temperature sensors 28 that are electrically connected to each other. The sensors 28 are mounted in proximity to the motor 24; and provide signals to the vehicle controller 26 that represent the temperature of the motor 24. The vehicle controller 26 compares the temperature values associated with the signals to predetermined thermal data to evaluate motor thermal performance. The vehicle system 20 also includes a transmission control module (TCM) 30 that is electrically connected to the motor 24 for controlling the motor output torque. The TCM 30 communicates with the vehicle controller 26 and controls the output torque of the motor 24 based on the motor thermal performance.

The illustrated embodiment depicts the vehicle 22 as a battery electric vehicle (BEV), which is an all-electric vehicle propelled by an electric motor 24 without assistance from an internal combustion engine (not shown). The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 22 include multiple motors (not shown) for propelling the vehicle 22. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The main battery 50 is a high voltage battery that is capable of outputting electrical power to operate the motor 24. The main battery 50 is a battery pack made up of several battery modules (not shown). Where each battery module contains a plurality of battery cells (not shown). The battery cells are heated and cooled using a fluid coolant system, according to at least one embodiment. The battery cells may be air cooled using existing vehicle cabin air, according to other embodiments. The BECM 52 acts as a controller for the main battery 50. The BECM 52 also includes an electronic monitoring system that manages temperature and state of charge of each of the battery cells. Other embodiments of the vehicle 22 contemplate different types of energy storage systems, such as capacitors and fuel cells (not shown).

The motor 24, the TCM 30, the gearbox 38, and the inverter 48 are collectively referred to as a transmission 54. The vehicle controller 26 communicates with the transmission 54, for coordinating the function of the transmission 54 with other vehicle systems. Although it is shown as a single controller, the vehicle controller 26 may include multiple controllers that may be used to control multiple vehicle systems. For example, the vehicle controller 26 may be a vehicle system controller/powertrain control module (VSC/PCM). In this regard, the PCM portion of the VSC/PCM may be software embedded within the VSC/PCM, or it can be a separate hardware device. The vehicle controller 26 generally includes any number of microprocessors, ASICs, ICs, memory (e.g., FLASH, ROM, RAM, EPROM and/or EEPROM) and software code to co-act with one another to perform a series of operations. The vehicle controller 26 communicates with other controllers (e.g., TCM 30, BECM 52) over a hardline vehicle connection 56 using a common bus protocol (e.g., CAN).

The TCM 30 is configured to control specific components within the transmission 54, such as the motor 24 and/or the inverter 48. The TCM 30 includes a motor controller for monitoring, among other things, the position, speed, and power consumption of the motor 24. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request. Some or all of these various controllers can make up a control system, which, for reference purposes, may be the vehicle controller 26. Although illustrated and described in the context of the vehicle 22, which is a BEV, it is understood that embodiments of the present application may be implemented on other types of vehicles, such as those powered by an internal combustion engine, either alone or in addition to one or more electric machines (e.g., HEVs, PHEVs, etc.).

The vehicle controller 26 provides information to the driver through a user interface 60. The vehicle controller 26 receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions. The vehicle controller 26 provides output to the user interface 60, such as a motor status, which is conveyed visually to the driver.

The vehicle 22 includes a climate control system 62 for heating and cooling various vehicle components. The climate control system 62 includes a high voltage positive temperature coefficient (PTC) electric heater 64 and a high voltage electric HVAC compressor 66, according to one or more embodiments. The PTC 64 and HVAC compressor 66 are used to heat and cool fluid, respectively, that circulates to the transmission 54 and to the main battery 50. Both the PTC 64 and the HVAC compressor 66 may draw electrical energy directly from the main battery 50. The climate control system 62 may include a controller (not shown) for communicating with the vehicle controller 26 over the CAN bus 56. The on/off status of the climate control system 62 is communicated to the vehicle controller 26, and can be based on, for example, the status of an operator actuated switch, or the automatic control of the climate control system 62 based on related functions, such as window defrost.

The vehicle 22 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically interposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 22 includes an AC charger 76 for charging the main battery 50. An electrical connector 78 connects the AC charger 76 to an external power supply (not shown) for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply (e.g., 110 volt, 220 volt, etc.). In one or more embodiments, the external power supply includes a device that harnesses renewable energy, such as a photovoltaic (PV) solar panel, or a wind turbine (not shown).

Also shown in FIG. 1 are simplified schematic representations of a driver controls system 80, a power steering system 82, and a navigation system 84. The driver controls system 80 includes braking, acceleration and gear selection (shifting) systems (all not shown). The braking system includes a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g., PRNDL) to the vehicle controller 26. The navigation system 84 may include a navigation display, a global positioning system (GPS) unit, a navigation controller and inputs (all not shown) for receiving destination information or other data from a driver. These components may be unique to the navigation system 84 or shared with other systems. The navigation system 84 may also communicate distance and/or location information associated with the vehicle 22, its target destinations, or other relevant GPS waypoints.

Figure 2:
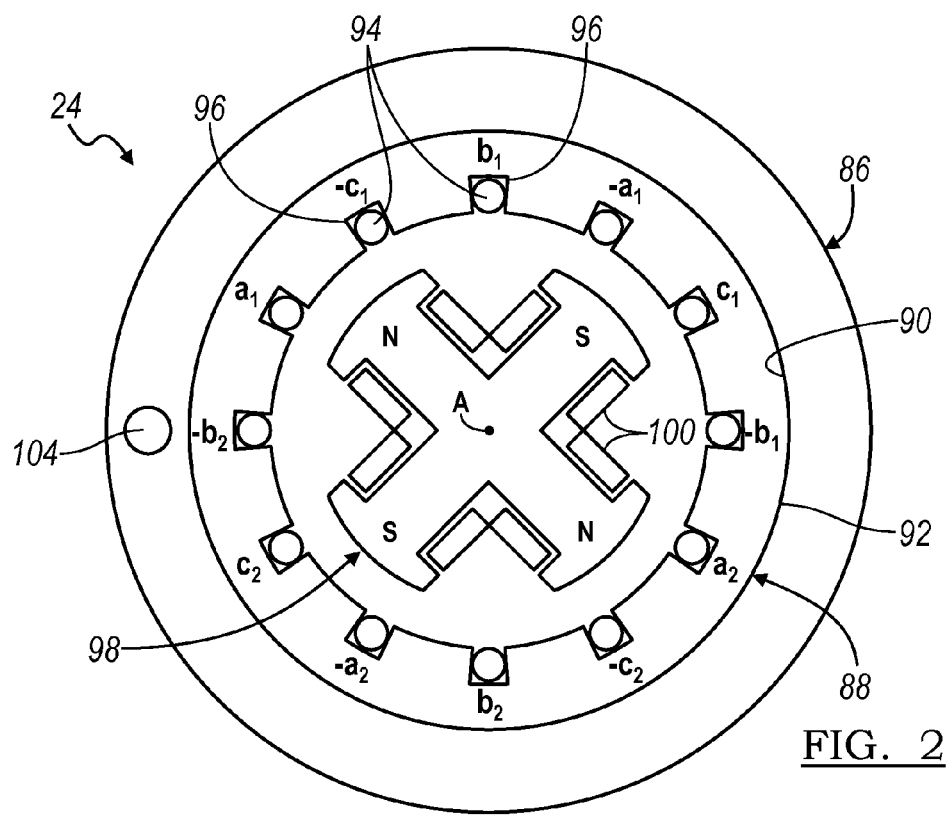
FIG. 2 is an enlarged section view of a motor of the vehicle system of FIG. 1.

FIG. 2 depicts an enlarged section view of the motor 24. The motor 24 is a polyphase synchronous motor, according to one or more embodiments. The motor 24 includes a housing 86 and a stator 88. The housing 86 defines an inner bore 90 for receiving the stator 88. The stator 88 is formed in a generally cylindrical shape with an outer surface 92 that engages the inner bore 90 for securing the stator 88 to the housing 86. The stator 88 is a stationary device and supports a number of armature windings 94 within slots 96. The armature windings 94 receive alternating current (AC) from the inverter 48 (FIG. 1) which produces a rotating magnetic field. The illustrated embodiment depicts a three phase synchronous motor 24, where the three phases are represented by letters "a", "b" and "c".

The motor 24 also includes a rotor 98 that rotates about axis A within the stator 88. The rotor 98 includes permanent magnets 100 which are secured to the rotor 98. The magnets 100 generate magnetic fields, which are stationary with respect to the structure of the rotor 98. The rotating magnetic field produced by the stator 88 creates an electromagnetic torque which drives (rotates) the rotor 98 about Axis A against a load torque (e.g., torque to propel the vehicle 22). Other embodiments of the rotor 98 include field windings (not shown) for generating magnetic fields.

The stator 88 is secured to the housing 86 as a result of the geometry of the two components, according to at least one embodiment. An inner diameter dimension of the inner bore 90, and an outer diameter dimension of the outer surface 92 are controlled to provide an interference-fit or "press-fit" between the housing 86 and the stator 88. This interface between the stator 88 and the housing 86 withstands a reactionary torque that results from the electromagnetic torque, which is approximately equal to the motor output torque. The illustrated embodiment depicts a three phase synchronous motor 24 that is rated at approximately 92 Kilowatts (kW), with a maximum output torque of approximately 246 newton-meters (Nm). Therefore the interface between the outer surface 92 of the stator 88 and the inner bore 90 of the housing 86 is subjected to a reactionary torque up to approximately 246 Nm.

The stator 88 and the housing 86 are formed of different materials, each having different thermal coefficients of expansion. The stator 88 is formed of steel having a coefficient of linear thermal expansion of approximately 1.1 cm/cm/degrees Celsius ($10^{-5}$), according to one or more embodiments. The housing 86 is formed of cast aluminum, having a coefficient of linear thermal expansion of approximately 2.2 cm/cm/degrees Celsius ($10^{-5}$), according to one or more embodiments.

Because the stator 88 and housing 86 are formed of different materials, each having a different thermal coefficient of expansion, the stator 88 and housing 86 will expand at different rates. Based on the geometry of the housing 86 and stator 88, along with the thermal coefficient of expansion of each respective material, thermal conditions are calculated at which the housing 86 expands and may disengage from the stator 88 when the motor 24 is operating at maximum motor torque.

Figure 3:
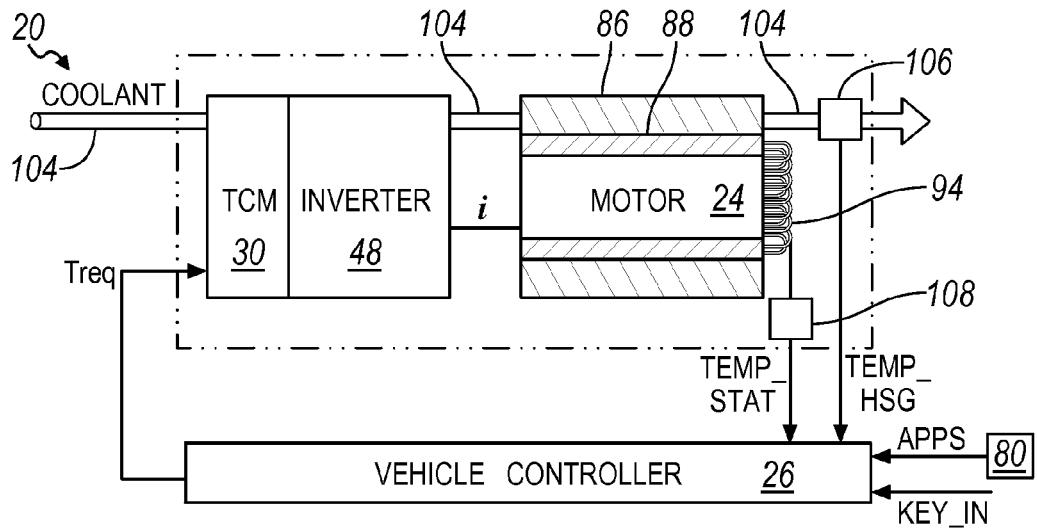
FIG. 3 is a schematic diagram further illustrating the vehicle system of FIG. 1.

With reference to FIGS. 2 and 3, the temperature of the motor 24 changes due to different vehicle operating conditions. When the vehicle 22 is not operating, the temperature of the housing 86 and the stator 88 are generally the same. However, when the motor 24 is operating (either as a motor or generator), the temperature of the stator 88 is generally higher than the housing 86, due to heat generated by the current flowing through the armature windings 94. The high temperature causes the stator 88 to expand and further engage the housing 86.

Also, the vehicle 22 cools the housing 86 when the motor 24 is operating. The climate control system 62 (FIG. 1) includes a coolant line 104 that is connected to the housing 86 for providing coolant. The illustrated embodiment depicts the coolant line 104 extending through the housing 86. In other embodiments, a fluid passage, or "water jacket", (not shown) is formed through the housing 86 for circulating coolant through the housing, and coolant inlet and outlet lines connect to the housing about the passage to provide fluid communication through the housing 86. The coolant decreases the temperature of the housing 86 during normal operating conditions of the vehicle 22, which causes the housing 86 to expand less than the stator 88, which provides further engagement between the housing 86 and the stator 88. The general conditions at which there is minimal engagement between the housing 86 and the stator 88 is when the housing 86 is hot (large inner bore 90) and the stator 88 is cold (small outer surface 92).

With reference to FIG. 3, the vehicle controller 26 receives input signals that represent temperature and position measurements. The vehicle controller 26 also includes predetermined thermal data that represents temperature conditions for maintaining engagement between the housing 86 and the stator 88. The predetermined thermal data includes a predetermined high temperature value, and a predetermined difference temperature value.

The vehicle system 20 monitors the temperature of the motor 24, and limits the allowable motor torque, if motor temperatures exceed predetermined temperature conditions. The vehicle system 20 includes temperature sensors 28 (FIG. 1) for measuring the temperature at various locations of the motor 24 and providing corresponding input signals to the vehicle controller 26. The temperature sensors 28 include a housing sensor 106 and a stator sensor 108.

The housing sensor 106 is connected to the coolant line 104, according to one or more embodiments. The housing sensor 106 measures the temperature of coolant as it flows away from the motor 24. The coolant absorbs heat from the housing 86 as it circulates through the housing 86. Therefore the temperature of the coolant represents the temperature of the housing 86. The housing sensor 106 may be located within the coolant line 104 and within the actual coolant path, or outside of the coolant line 104 to measure heat conducted through the coolant line 104. The housing sensor 106 provides a housing signal (TEMP_HSG) to the vehicle controller 26 that represents the temperature of the housing 86.

The stator sensor 108 is connected to an armature winding 94 of the stator 88, according to one or more embodiments. As illustrated in FIG. 3, the armature windings 94 form loops, that extend from an end of the stator 88. The stator sensor 108 may be connected to a loop of the windings 94, for measuring the temperature of the winding 94. The armature windings 94 transfer heat to the stator 88 by conduction. Therefore the temperature of the armature windings 94 represents the temperature of the stator 88. The stator sensor 108 provides a stator signal (TEMP_STAT) to the vehicle controller 26 that represents the temperature of the stator 88.

The vehicle controller 26 receives input signals (KEY_IN and APPS) that represent requests from the driver. The KEY_IN signal corresponds to a position of an ignition key (not shown) or the start of a drive cycle (for vehicles without keys). The KEY_IN signal represents a driver request to start or stop the vehicle. The KEY_IN signal may be received over the CAN bus 56 (FIG. 1) or directly from a key sensor (not shown). The APPS signal corresponds to a position of an accelerator pedal (not shown), which represents a drivers throttle request. The APPS signal may be received over the CAN bus 56 or directly from the driver control system 80.

The vehicle controller 26 compares the input signals (TEMP_HSG and TEMP_STAT) to the predetermined data to evaluate motor performance. The vehicle controller 26 provides an output signal (Treq) to the TCM 30 that represents a motor torque request based on the driver's throttle request, and the motor performance. For example, in one embodiment the vehicle controller 26 receives a APPS signal corresponding to a driver throttle request for maximum motor torque. The vehicle controller 26 determines that thermal conditions of the motor exceed predetermined thermal data. Therefore the vehicle controller 26 limits motor torque by providing a torque request (Treq) to the TCM 30 that is less than the driver's throttle request.

Figure 4:
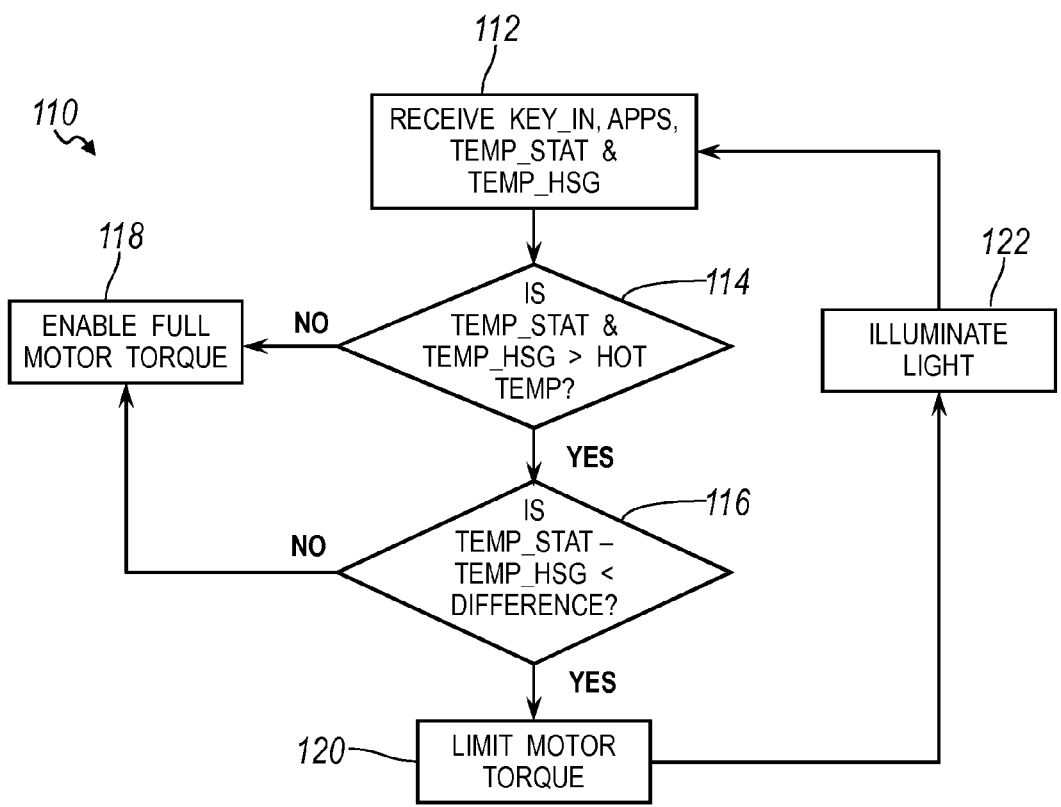
FIG. 4 is a flow chart illustrating a method for controlling motor torque according to one or more embodiments.

FIG. 4 illustrates a method 110 for controlling motor torque based on motor temperatures, according to one or more embodiments. The method 110 is performed by at least one controller (the vehicle controller 26 and the TCM 30) of the vehicle system 20 (shown in FIG. 3). The vehicle controller 26 and TCM 30 generally include any number of microprocessors, ASICs, ICs, memory (e.g., FLASH, ROM, RAM, EPROM and/or EEPROM) which co-act with software code to perform the operations of the method 110.

In operation 112, the vehicle controller 26 receives input signals from individual systems or sensors of the vehicle. The inputs include the ignition key signal (KEY_IN), the accelerator pedal position signal (APPS), the stator signal (TEMP_STAT), and the housing signal (TEMP_HSG).

In operation 114, the vehicle controller 26 compares the TEMP_STAT signal and the TEMP_HSG signal to a predetermined high temperature value. The predetermined high temperature value represents a temperature of the motor 24, above which the housing 86 expands and disengages from the stator 88, when the motor 24 is operating at maximum motor torque. For example, in one embodiment, the predetermined high temperature value is between fifty five and sixty five degrees Celsius. In another embodiment, the predetermined high temperature value is approximately sixty degrees Celsius. Such high temperatures may occur when the vehicle is parked in a hot environment (e.g., the Arizona desert). The initial temperature of the housing 86 and the stator 88 are approximately equal, because the motor 24 is not operating to heat the stator 88, and the climate control system is not operating to cool the housing 86.

If the determination in operation 114 is positive, then the vehicle controller 26 proceeds to operation 116. In operation 116 the vehicle controller 26 calculates a temperature difference value based on a difference between the temperature of the stator 88 and the temperature of the housing 86, (TEMP_STAT−TEMP_HSG). The vehicle controller 26 compares the temperature difference value to a predetermined temperature difference to evaluate motor performance. The predetermined temperature difference represents a minimum value for maintaining engagement between the stator 88 and the housing 86 when the motor 24 is operating at maximum motor torque. For example, in one embodiment, the predetermined temperature difference is between thirty and forty degrees Celsius. In another embodiment, the predetermined temperature difference is approximately thirty two degrees Celsius (89.6° F.). The predetermined difference temperature is largest when the stator 88 is cold and the housing 86 is hot.

If the determination in operation 114 or operation 116 is negative, then the vehicle controller 26 proceeds to operation 118 and enables full motor torque. The vehicle controller 26 enables full motor torque by providing a torque request to the TCM 30 that is based on the driver's throttle request, and not limited by motor thermal performance.

If the determination at operation 116 is positive then the vehicle controller 26 proceeds to operation 120 and limits motor torque. The vehicle controller 26 limits motor by providing a torque request to the TCM 30 that is based on the driver's request for wheel torque and limited by the motor thermal performance. The predetermined thermal data includes a predetermined motor torque limit. The predetermined motor torque limit is a maximum torque value that the vehicle controller 26 will request from the TCM 30 at operation 120.

The predetermined motor torque limit is a percentage of the maximum motor torque, according to one embodiment. For example, in one embodiment, the maximum motor torque is approximately 246 Nm, and the predetermined motor torque limit is 172 Nm, which is approximately seventy percent of the maximum motor torque. If the driver's throttle request corresponds to a motor torque of 200 Nm, then the vehicle controller 26 will limit the motor torque at operation 120 by providing a Treq signal to the TCM 30 that corresponds to the predetermined motor torque limit (172 Nm). Other embodiments of the vehicle system 20 and method 110 contemplate other predetermined motor torque limits, (e.g., fifty percent or sixty percent of maximum motor torque).

However, the vehicle controller 26 does not limit the motor torque, if the driver's throttle request corresponds to a motor torque that is below the predetermined motor torque limit. For example, in another embodiment, the maximum motor torque is approximately 246 Nm, and the predetermined motor torque limit is 172 Nm. If the driver's throttle request corresponds to 100 Nm of motor torque, then the vehicle controller 26 provides a Treq signal to the TCM 30 that corresponds to 100 Nm. The vehicle controller 26 does not limit the torque request (Treq) in this example because the throttle request is below the predetermined motor torque limit (172 Nm).

Figure 5:
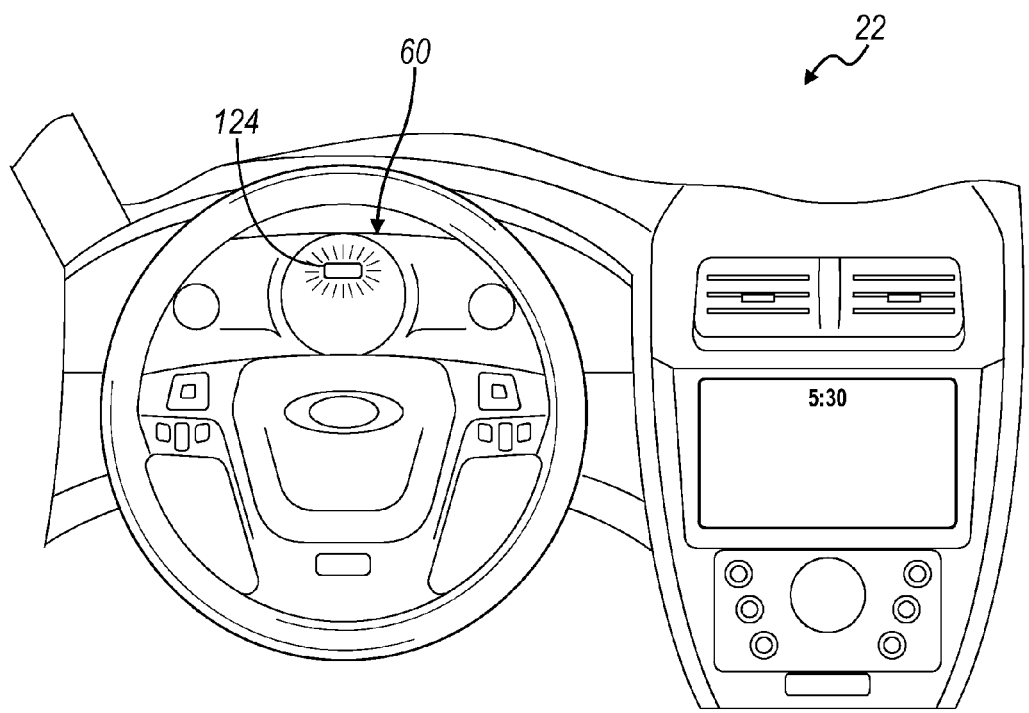
FIG. 5 is a front perspective view of a user interface of the vehicle system of FIG. 1.

With reference to FIGS. 4 and 5, after the vehicle controller 26 limits motor torque in operation 120, the vehicle system 20 conveys this information to the driver at operation 122. The vehicle controller 26 provides a motor status message to the user interface 60, and the user interface 60 conveys this information to the driver. The user interface 60 is an instrument cluster according to the illustrated embodiment. The user interface 60 includes a lamp 124 (or indicia), that is illuminated at operation 122 in response to the motor performance. Other embodiments of the vehicle system 20 include messages or images that are displayed on a touch screen; or audible messages that are conveyed to the driver.

After operation 122, the vehicle controller 26 returns to operation 112. In one or more embodiments, the vehicle system 20 does not change the display on the user interface 60 during a drive cycle. For example, after the lamp 124 is illuminated at operation 122, the vehicle system 20 may keep the lamp 124 illuminated for the rest of the drive cycle, even if full motor torque is later enabled. The lamp 124 may be turned off after the driver parks the vehicle, and turns the ignition key to the off position. The vehicle system 20 may keep the lamp 124 illuminated to avoid the lamp 124 turning on and off repeatedly during a drive cycle.

The vehicle system 20 of FIG. 1 includes one motor 24 for propelling the vehicle 22. Therefore the driver will notice when the motor torque is limited to a value less than the driver's throttle request. However, in other embodiments, the vehicle 22 includes multiple motors (not shown) or a motor and an engine (not shown) where the torque of one power source may compensate for the limited torque of another source.

As such, various embodiments provide one or more advantages. For example, the vehicle system provides vehicle propulsion at extreme temperature conditions by monitoring motor temperatures to evaluate motor performance, and controlling motor torque in response to the motor performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
   a motor having a housing and a stator, and configured to provide motor torque for vehicle propulsion; and
   at least one controller configured to receive input indicative of at least one of the housing temperature and the stator temperature, and control the motor torque based on a comparison of the input to predetermined thermal data, wherein the predetermined thermal data includes a predetermined high temperature indicative of a motor temperature above which the housing expands and disengages from the stator when the motor is operating at maximum motor torque;
   wherein the at least one controller is further configured to compare at least one of the housing temperature and the stator temperature to the predetermined high temperature to evaluate motor performance.

2. The vehicle system of claim 1 wherein the housing defines an inner bore, and the stator is formed in a generally cylindrical shape with an outer surface adapted to engage the inner bore for securing the stator to the housing; and
   wherein the predetermined thermal data is indicative of a temperature condition for maintaining engagement between the housing and the stator.

3. The vehicle system of claim 1 wherein the at least one controller comprises a vehicle controller communicating with at least one sensor coupled to the motor, the vehicle controller configured to:
   receive the input indicative of at least one of a housing temperature and a stator temperature from the at least one sensor;
   compare at least one of the housing temperature and the stator temperature to the predetermined thermal data to evaluate motor performance; and
   provide output indicative of a motor torque request in response to the motor performance.

4. The vehicle system of claim 3 wherein the at least one controller further comprises a control module communicating with the motor and the vehicle controller, wherein the control module is configured to control the motor torque based on the output of the vehicle controller, by providing current to the motor that corresponds to the motor torque request.

5. The vehicle system of claim 1 wherein the predetermined thermal data further comprises a predetermined temperature difference indicative of a minimum value for maintaining engagement between the stator and the housing when the motor is operating at maximum motor torque; and
   wherein the at least one controller is further configured to:
      calculate a temperature difference value based on a difference between the stator temperature and the housing temperature, and
      compare the temperature difference value to the predetermined temperature difference to evaluate motor performance.

6. The vehicle system of claim 5 wherein the predetermined thermal data further comprises a predetermined motor torque limit that is less than a maximum motor torque, and wherein the at least one controller is further configured to:
   receive a throttle request that corresponds to a desired motor torque;
   compare the throttle request to the predetermined motor torque limit; and
   provide the motor torque request based on the predetermined motor torque limit when the desired motor torque exceeds the predetermined motor torque limit, the housing temperature and the stator temperature exceed the predetermined high temperature, and the temperature difference value is less than the predetermined temperature difference.

7. A vehicle system comprising:
   at least one controller configured to:
      receive input indicative of a motor housing temperature and a motor stator temperature,
      calculate a temperature difference value based on a difference between the housing temperature and the stator temperature,
      compare the temperature difference value to a predetermined temperature difference to evaluate motor performance, and
      provide output indicative of a motor torque request in response to the motor performance.

8. The vehicle system of claim 7 wherein the at least one controller is further configured to control motor torque based on the output.

9. The vehicle system of claim 7 further comprising:
   a housing sensor connected to a motor coolant line extending from the housing, and configured to provide a housing signal indicative of the motor housing temperature to the at least one controller; and
   a stator sensor connected to a motor winding extending from the stator, and configured to provide a stator signal indicative of the stator temperature to the at least one controller.

10. The vehicle system of claim 7 wherein the at least one controller is further configured to provide output indicative of a motor torque request that is less than a maximum motor torque when the temperature difference value is less than the predetermined temperature difference.

11. The vehicle system of claim 7 wherein the at least one controller is further configured to compare at least one of the housing temperature and the stator temperature to a predetermined high temperature to evaluate motor performance, wherein the predetermined high temperature is indicative of a temperature of a motor, above which the motor housing expands and disengages from the motor stator, when the motor is operating at full motor torque.

12. The vehicle system of claim 11 wherein the predetermined high temperature is between 55 and 65 degrees Celsius.

13. The vehicle system of claim 11 wherein the at least one controller is further configured to limit motor torque by providing a motor torque request that is less than a maximum motor torque when the temperature difference value is less than the predetermined temperature difference and each of the motor stator temperature and the motor housing temperature are above the predetermined high temperature.

14. A vehicle comprising:
   a motor having a housing and a stator and configured to provide torque for vehicle propulsion;
   at least one sensor coupled to the motor and configured to provide a signal indicative of at least one of a housing temperature and a stator temperature;
   at least one controller communicating with the motor and configured to control the motor torque based on a comparison of the signal to predetermined thermal data; and a user interface in communication with the controller and configured to display a motor status message based on the comparison of the signal to the predetermined thermal data.

15. The vehicle of claim 14 wherein the at least one controller further comprises:
  a control module communicating with the motor; and
  a controller communicating with the control module and the at least one sensor, the controller configured to:
    compare at least one of the housing temperature and the stator temperature to the predetermined thermal data to evaluate motor performance, and
    provide output to the control module indicative of a motor torque request in response to the motor performance;
  wherein the control module is configured to control the motor torque based on the output of the controller.

16. The vehicle of claim 14 further comprising:
  a coolant system having at least one coolant line connected to the housing for circulating a fluid through the housing;
  wherein the at least one sensor comprises a housing sensor connected to the coolant line and configured to provide the signal indicative of the housing temperature.

17. The vehicle of claim 14 further comprising:
  a battery electrically connected to at least one winding extending through the stator for providing electrical current to the motor;
  wherein the at least one sensor comprises a stator sensor connected to the at least one winding and configured to provide the signal indicative of the stator temperature.

18. The vehicle of claim 17 wherein the at least one controller is further configured to compare at least one of the housing temperature and the stator temperature to a predetermined high temperature to evaluate motor performance;
  wherein the predetermined high temperature is indicative of a motor temperature above which the housing expands and disengages from the stator when the motor is operating at full motor torque.

19. A vehicle system comprising:
  a motor having a housing and a stator, and configured to provide motor torque for vehicle propulsion; and
  at least one controller configured to receive input indicative of the housing temperature and the stator temperature, and to limit the motor torque based on a difference between the stator temperature and the housing temperature.

* * * * *